US009830843B2

(12) United States Patent
Wu

(10) Patent No.: US 9,830,843 B2
(45) Date of Patent: Nov. 28, 2017

(54) 3D DISPLAY DRIVING METHOD AND 3D GLASSES DRIVING METHOD

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 3 days.

(21) Appl. No.: 14/443,810

(22) PCT Filed: Oct. 11, 2014

(86) PCT No.: PCT/CN2014/088382
§ 371 (c)(1),
(2) Date: May 19, 2015

(87) PCT Pub. No.: WO2015/192550
PCT Pub. Date: Dec. 23, 2015

(65) Prior Publication Data
US 2016/0253934 A1 Sep. 1, 2016

(30) Foreign Application Priority Data
Jun. 16, 2014 (CN) .......................... 2014 1 0267692

(51) Int. Cl.
G09G 3/00 (2006.01)
H04N 13/04 (2006.01)

(52) U.S. Cl.
CPC ........... G09G 3/003 (2013.01); H04N 13/044 (2013.01); H04N 13/0438 (2013.01);
(Continued)

(58) Field of Classification Search
CPC ............... G09G 3/003; G09G 2354/00; G09G 2320/0209; H04N 13/044; H04N 13/0497; H04N 13/0438
See application file for complete search history.

(56) References Cited

U.S. PATENT DOCUMENTS

2009/0315883 A1 12/2009 King
2011/0141230 A1* 6/2011 Bai .................... H04N 13/0007
348/43
(Continued)

FOREIGN PATENT DOCUMENTS

CN 102510509 A 6/2012
CN 102647609 A 8/2012
(Continued)

OTHER PUBLICATIONS

International Search Report Appln. No. PCT/CN2014/088382; dated Mar. 16, 2015.
(Continued)

Primary Examiner — Alexander Eisen
Assistant Examiner — Abhishek Sarma
(74) Attorney, Agent, or Firm — Ladas & Parry LLP; Loren K. Thompson

(57) ABSTRACT

A 3D display driving method and a 3D glasses driving method are provided. In the 3D display driving method, after a left-eye image and a right-eye image in a stereoscopic image pair of each frame are displayed, one frame of buffer image is inserted, then a left-eye image and a right-eye image in a stereoscopic image pair of a next frame are displayed. By inserting one frame of buffer image between two consecutive frames of left-eye and right-eye image pairs, the dizziness and blurring feeling generated due to the visual persistence characteristics of the human eyes when the human brain processes different image pairs are relieved.

9 Claims, 2 Drawing Sheets

(52) U.S. Cl.
CPC . *H04N 13/0497* (2013.01); *G09G 2320/0209* (2013.01); *G09G 2354/00* (2013.01)

(56) References Cited

U.S. PATENT DOCUMENTS

| | | | |
|---|---|---|---|
| 2013/0002650 A1* | 1/2013 | Ko | G02B 27/2264 345/419 |
| 2013/0057545 A1 | 3/2013 | Nakahata | |
| 2013/0082999 A1* | 4/2013 | Ahn | G09G 3/003 345/212 |
| 2013/0093863 A1* | 4/2013 | Hou | G09G 3/003 348/54 |
| 2013/0328907 A1* | 12/2013 | Ballestad | H04N 1/6027 345/590 |
| 2014/0118340 A1 | 5/2014 | Huang et al. | |

FOREIGN PATENT DOCUMENTS

| | | |
|---|---|---|
| CN | 10286902 A | 1/2013 |
| CN | 102868904 A | 1/2013 |
| CN | 103081486 A | 5/2013 |
| CN | 104052988 A | 9/2014 |
| EP | 2541499 A2 | 1/2013 |
| EP | 2541948 A1 | 1/2013 |
| KR | 1020090098489 A | 9/2009 |
| KR | 1020120031400 A | 4/2012 |

OTHER PUBLICATIONS

Written Opinion of the International Searching Authority Appln. No. PCT/CN2014/088382; dated Mar. 16, 2015.

First Chinese Office Action Appln. No. 201410267692.6; dated Jul. 16, 2015.

* cited by examiner

3D DISPLAY DRIVING METHOD AND 3D GLASSES DRIVING METHOD

TECHNICAL FIELD

Embodiments of the invention relate to a 3D display driving method and a 3D glasses driving method.

BACKGROUND

A shutter glasses stereoscopic display technology is one of the most popular stereoscopic display technologies. The basic principle of the shutter glasses stereoscopic display technology is that: at a first moment, a display panel displays a left-eye image, at the same time, a left-eye eyeglass of the shutter glasses worn by a viewer is turned on (light transmitting state), while a right-eye eyeglass is turned off (light shielding state), so only a left eye of the viewer can see the left-eye image displayed at that moment, referring to a left part of FIG. 1; at a second moment, the display panel displays a right-eye image, at the same time, the left-eye eyeglass of the shutter glasses worn by the viewer is turned off (light shielding state), while the right-eye eyeglass is turned on (light transmitting state), so only a right eye of the viewer can see the right-eye image displayed at that moment, referring to a right part of FIG. 1. The display panel alternately displays the left-eye and right-eye images over time, and the left-eye eyeglass and the right-eye eyeglass of the shutter glasses are alternately turned on. A time interval between the first moment and the second moment is very short, about 1/120 s, so due to a visual persistence effect of the human eyes, the viewer will merge the left-eye and right-eye images separately seen by the left and right eyes into a stereoscopic effect, generating a stereoscopic sense.

A shutter glasses stereoscopic display device comprises: a shutter glasses which may be switched between the light shielding state and the light transmitting state; a display panel with a scanning frequency of over 120 Hz; and a coupling device for communication between the two. The eyeglass of the shutter glasses often works in a Super Twisted Nematic (STN) mode, including: an upper substrate and a lower substrate; polarizers located outside the upper and lower substrates; a transparent electrode, an alignment layer and a liquid crystal layer, which are located between the upper substrate and the lower substrate. By supplying power to upper and lower transparent electrodes to control rotation of liquid crystal molecules, the eyeglass can be switched between the light transmitting state and the light shielding state, of which the response time may be up to 1.5-2 ms. In order to ensure that no flicker is observed, generally the scanning frequency of the display panel should be 60 Hz at least, but, because the visual persistence time of the human eyes should be taken into consideration for the shutter glasses stereoscopic display, the scanning frequency thereof should be increased to 120 Hz at least.

The biggest advantage of the shutter glasses stereoscopic display is: not many changes should be made to the current display panel, and it is just required to raise the scanning frequency thereof; however, in the shutter glasses stereoscopic display technology, the shutter glasses comprises a eyeglass, a control circuit board, a battery, a glasses case and so on, so it is heavy, and not convenient for carrying; secondly, current display devices all work in a row sequential driving mode, namely, before one frame of image is completely scanned, the left-eye image and the right-eye image coexist on a screen, so a crosstalk may occur. FIG. 2 gives a method to resolve the crosstalk, in which black means that the eyeglass of the glasses is turned off, i.e., in the light shielding state; while white means that the eyeglass of the glasses is turned on, i.e., in the light transmitting state; as shown in FIG. 2, before one frame of image is completely scanned, both the left-eye eyeglass and the right-eye eyeglass are in light shielding state, and the corresponding eyeglass is only turned on in a Vblank stage, where the Vblank stage refers to the time from an end of one scanning to a start of next one scanning.

The shutter glasses stereoscopic display technology also has a defect; as shown in FIG. 3, the viewer sees a Left 1 (L1) image by the left eye and a Right 1 (R1) image by the right eye at the first moment and the second moment, respectively, and the L1 image and the R1 image are of a stereoscopic image pair, which can be merged by the human brain to form a stereoscopic image, but at a next moment, that is, a third moment, the left eye sees a Left 2 (L2) image, and at that moment the right eye still sees the R1 image due to the visual persistence characteristic of the human eyes. However, the L2 image and the R1 image do not belong to one stereoscopic image pair, and therefore, when the L2 image and the R1 image are merged by the human brain, it may cause dizziness, blurred feeling and so on, which is not good for stereoscopic display experience.

SUMMARY OF THE INVENTION

Embodiments of the present invention provide a 3D display driving method and a 3D glasses driving method, to avoid a case in that the human brain will process an uncoupled 3D image pair during stereoscopic viewing, thereby eliminating dizziness and blurred feeling, and improving the comfort degree of stereoscopic display experience.

In one aspect, an embodiment of the present invention provides a 3D display driving method, wherein, after a left-eye image and a right-eye image in a stereoscopic image pair of each frame are displayed, one frame of buffer image is inserted, then a left-eye image and a right-eye image in a stereoscopic image pair of a next frame are displayed.

Exemplarily, the buffer image is a monochrome image.

Exemplarily, a brightness of the monochrome image is 15~25 nit.

Exemplarily, the monochrome image is a black, gray or white image.

Exemplarily, a color value of a pixel in the buffer image is an average value of color values of corresponding pixels of the left-eye image and the right-eye image in the stereoscopic image pair of the next frame.

Exemplarily, in a case where a left-eye image in a stereoscopic image pair of a previous frame of the one frame of buffer image is displayed later, the left-eye image in the stereoscopic image pair of the next frame of the buffer image will be displayed first; in a case where the right-eye image in the stereoscopic image pair of the previous frame of the one frame of buffer image is displayed later, the right-eye image in the stereoscopic image pair of the next frame of the buffer image will be displayed first.

In another aspect, an embodiment of the present invention further provides a 3D glasses driving method based on the above 3D display driving method: a left-eye eyeglass is turned on when the display panel displays a left-eye image, while a right-eye eyeglass is still turned off; the right-eye eyeglass is turned on when the display panel displays a right-eye image, while the left-eye eyeglass is still turned off; and both the left-eye eyeglass and the right-eye eyeglass are turned on when the display panel displays the buffer image.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Hereinafter, embodiments of the present invention will be further illustrated in detail in conjunction with the accompanying drawings. The embodiments below are only to illustrate the embodiments of the present invention, but are not to limit the scope of the embodiments of the present invention.

Figure 4:
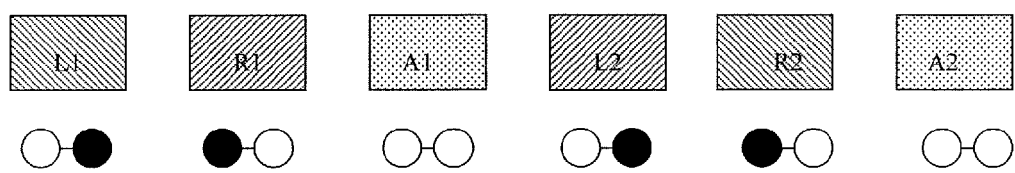
FIG. 4 is a schematic diagram of an order of displaying a left-eye image, a right-eye image, and a buffer image, and corresponding turned-on and turned-off states of left-eye and right-eye eyeglasses of a 3D glasses, in a 3D display driving method according to an embodiment of the present invention.

In a 3D display driving method provided by an embodiment of the present invention, one frame of buffer image is inserted after a left-eye image and a right-eye image in each frame of stereoscopic image pair are displayed, then a left-eye image and a right-eye image in a next frame of stereoscopic image pair are displayed. As shown in FIG. 4, a left-eye image L1 and a right-eye image R1 in a stereoscopic image pair 1 are displayed, then one frame of buffer image A1 is inserted, and a left-eye image L2 and a right-eye image R2 in a stereoscopic image pair 2 are displayed, and then one frame of buffer image A2 is inserted, and so on, and subsequent images will be displayed.

In the 3D display driving method provided by the embodiment of the present invention, one frame of buffer image is inserted between two consecutive frames of left-eye and right-eye image pair, thus relieving the dizziness and blurring feeling generated due to the visual persistence characteristics of the human eyes when the human brain processes different image pairs.

Exemplarily, the buffer image may be a monochrome image; in order to relieve stimulation to retinas of the human eyes, the buffer image may be a relatively dark monochrome image, and its brightness is 15~25 nit, for example, 20 nit. In terms of color, the buffer image may be, for example, a black, gray or white image which is less stimulating to the human eyes.

In order to further reduce a visual difference between the buffer image and the next frame of image, the buffer image may be generated in a following way: a color value of one pixel in the buffer image is an average value of color values of corresponding pixels of the left-eye image and the right-eye image in the stereoscopic image pair of the next frame.

So, when the next frame of image is displayed after the right-eye image R1 is displayed, the left eye sees the left-eye image L2, while the right eye sees the buffer image A1; although the buffer image and the L2 in the left eye do not belong to one stereoscopic image pair, the buffer image is a number of blurry color blocks, or an entire monochrome image, which cannot be merged by the human brain, so it is equivalent to one eye of a viewer to see the image. In this way, the uncomfortable feeling of seeing a pair of uncoupled stereoscopic images is reduced.

Figure 5:
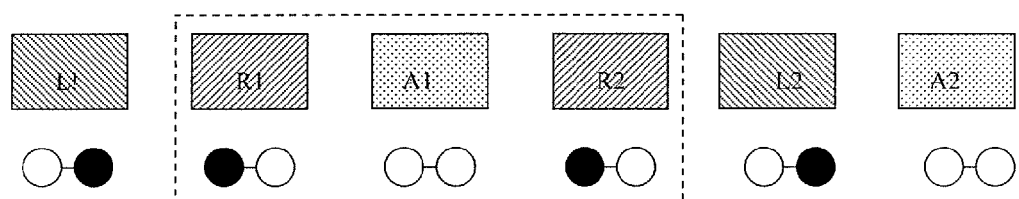
FIG. 5 is a schematic diagram of an order of displaying a left-eye image, a right-eye image, and a buffer image, and corresponding turned-on and turned-off states of eyeglasses of a 3D glasses, in another 3D display driving method according to an embodiment of the present invention.

In FIG. 4, after the buffer image A1 is seen, when the left-eye image L2 is scanned, the buffer image is still in the right eye, so no stereoscopic feeling appears at this moment, and the stereoscopic feeling will appear until the right-eye image R2 is completely scanned. However, if the left-eye image and the right-eye image are always displayed in this order, both eyes will lose balance. Therefore, further, if, when a stereoscopic image pair of one frame before the one frame of buffer image is displayed, a left-eye image is displayed later, then, when a stereoscopic image pair of one frame after the buffer image is displayed, a left-eye image will be displayed first; if, when a stereoscopic image pair of one frame before the one frame of buffer image is displayed, a right-eye image is displayed later, then, when a stereoscopic image pair of one frame after the buffer image is displayed, a right-eye image will be displayed first. Namely, the left-eye and right-eye images are scanned in an order of: a left-eye image, a right-eye image, a buffer image, a right-eye image, a left-eye image, a buffer image, a left-eye image, a right-eye image, a buffer image . . . and so on, as shown in FIG. 5 (in dashed line box). So, when two adjacent frames of image pairs are displayed, the left-eye image and the right-eye image exchange their positions, so that the left and right eyes are used evenly as a whole.

For a case of wearing a 3D glasses for viewing, the 3D glasses driving method is that: a left-eye eyeglass is turned on when a left-eye image is displayed, while a right-eye eyeglass is still turned off; the right-eye eyeglass is turned on when a right-eye image is displayed, while the left-eye lens is still turned off; and both the left-eye eyeglass and the right-eye eyeglass are turned on when a buffer image is displayed.

Figure 1:
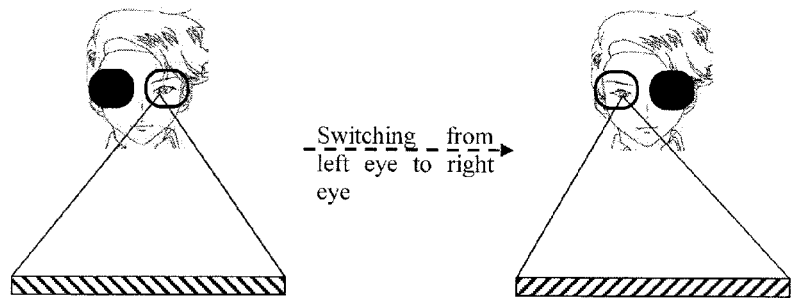
FIG. 1 is a schematic diagram of a 3D glasses alternately viewing a left-eye image and a right-eye image in a conventional shutter glasses stereoscopic display technology.
Figure 2:
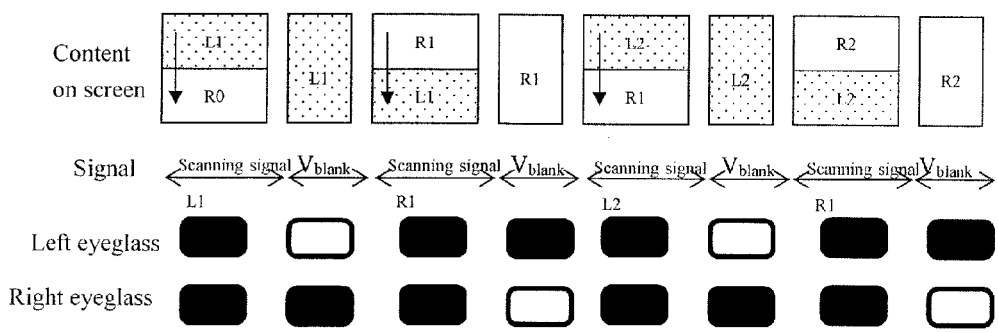
FIG. 2 is a schematic diagram of a process of a display panel displaying a left-eye image and a right-eye image in a conventional 3D display driving method, and corresponding turned-on and turned-off states of left-eye and right-eye eyeglasses of a 3D glasses.
Figure 3:
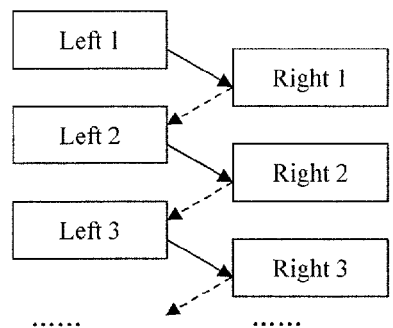
FIG. 3 is a switching order diagram of a left-eye image and a right-eye image in the conventional 3D display driving method.

The display panels using the 3D display driving method in the embodiment of the present invention may be various display panels, for example, a liquid crystal display panel, an Organic Light Emitting Display (OLED) panel and so on. The time for the left-eye image and the right-eye image after the buffer image is scanned (that is, the Vblank in FIG. 2, the time from an end of one scanning to a start of another scanning) should be as long as possible, to prolong the time of stereoscopic effect seen by the viewer and shorten the time of non-stereoscopic effect.

In the 3D display driving method and the 3D glasses driving method provided in embodiments of the present invention, one frame of buffer image is inserted between two consecutive frames of left-eye and right-eye image pairs, thus relieving the dizziness and blurring feeling generated due to the visual persistence characteristics of the human eyes when the human brain processes different image pairs.

The embodiment of the invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

The present application claims priority of Chinese Patent Application No. 201410267692.6 filed on Jun. 16, 2014, the disclosure of which is incorporated herein by reference in its entirety as part of the present application.

What is claimed is:

1. A 3D display driving method, wherein, after a left-eye image and a right-eye image in a stereoscopic image pair of each frame are displayed, one frame of buffer image is inserted, then a left-eye image and a right-eye image in a stereoscopic image pair of a next frame are displayed;

in a case in that a left-eye image in a stereoscopic image pair of a previous frame of the one frame of buffer image is displayed later, a left-eye image in a stereoscopic image pair of a next frame of the buffer image will be displayed first, wherein the left-eye image in the previous frame which is displayed later and the left-eye image in the next frame of the buffer image which will be displayed first belong to different stereoscopic image pairs of two consecutive frames respectively; in a case in that a right-eye image in the stereoscopic image pair of the previous frame of the one frame of buffer image is displayed later, a right-eye image in the stereoscopic image pair of the next frame of the buffer image will be displayed first, wherein the right-eye image in the previous frame which is displayed later and the right-eye image in the next frame of the buffer image which will be displayed first belong to different stereoscopic image pairs of two consecutive frames respectively.

2. The 3D display driving method according to claim 1, wherein the buffer image is a monochrome image.

3. The 3D display driving method according to claim 2, wherein a brightness of the monochrome image is 15~25 nit.

4. The 3D display driving method according to claim 3, wherein the brightness of the monochrome image is 20 nit.

5. The 3D display driving method according to claim 2, wherein the monochrome image is a black, gray or white image.

6. The 3D display driving method according to claim 1, wherein a color value of one pixel in the buffer image is an average value of color values of corresponding pixels of the left-eye image and the right-eye image in the stereoscopic image pair of the next frame.

7. The 3D display driving method according to claim 1, wherein the display panel displays images sequentially and repeatedly in an order of a left-eye image, a right-eye image, a buffer image, a right-eye image, a left-eye image, a buffer image.

8. A 3D glasses driving method based on the 3D display driving method according to claim 1, wherein a left-eye eyeglass is turned on when the display panel displays a left-eye image, while a right-eye eyeglass is still turned off; the right-eye eyeglass is turned on when the display panel displays a right-eye image, while the left-eye eyeglass is still turned off; and both the left-eye eyeglass and the right-eye eyeglass are turned on when the display panel displays the buffer image.

9. The 3D display driving method according to claim 1, wherein the left-eye image and the right-eye image in the stereoscopic image pair are continuously displayed.

* * * * *